UNITED STATES PATENT OFFICE.

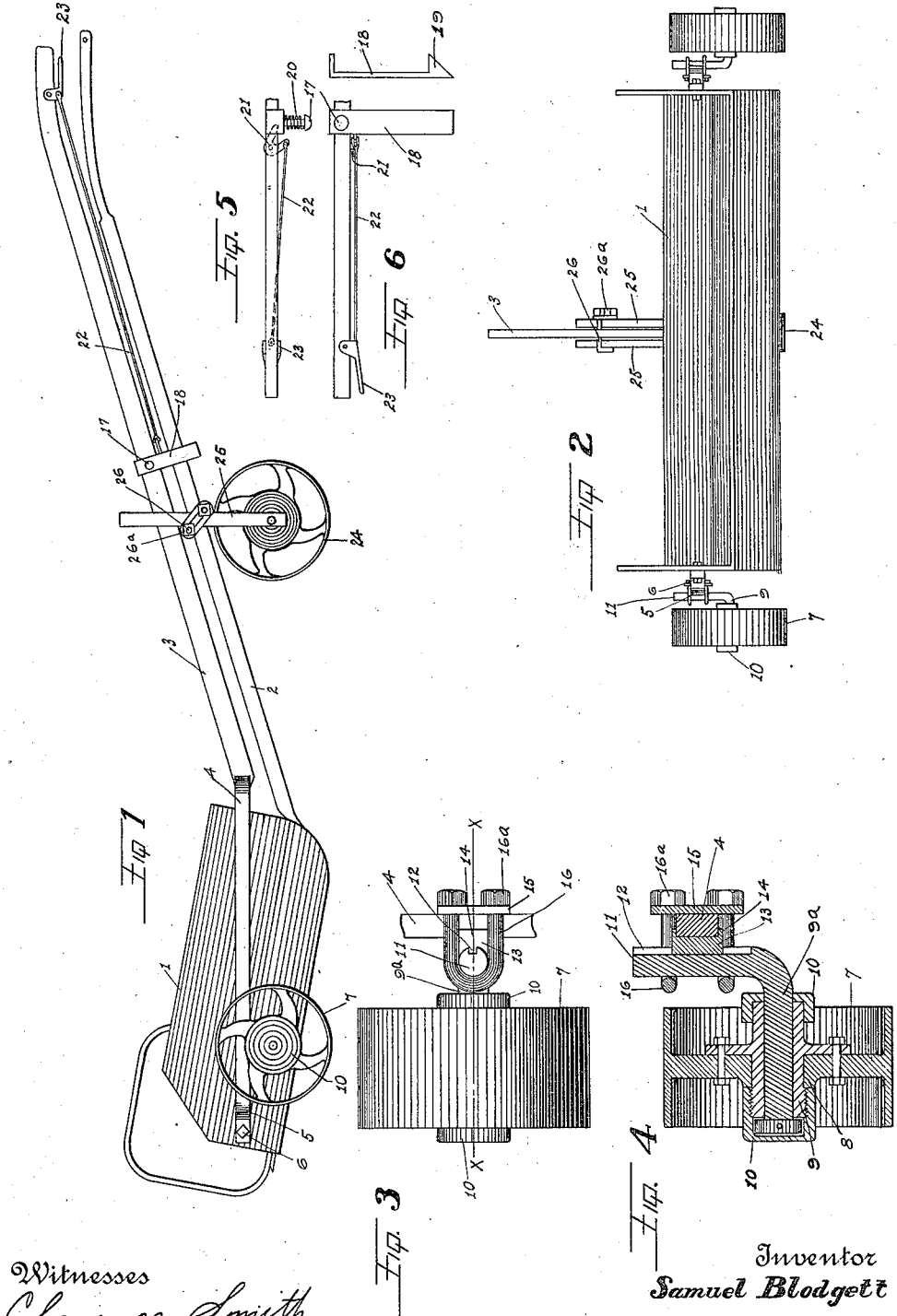

SAMUEL BLODGETT, OF CLEMENTS, CALIFORNIA.

WHEEL ATTACHMENT FOR DRAG-SCRAPERS.

1,045,367.  Specification of Letters Patent.  Patented Nov. 26, 1912.

Application filed March 23, 1912. Serial No. 685,680.

*To all whom it may concern:*

Be it known that I, SAMUEL BLODGETT, a citizen of the United States, residing at Clements, in the county of San Joaquin, State of California, have invented certain new and useful Improvements in Wheel Attachments for Drag-Scrapers; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in scrapers and particularly to drag scrapers, the object of the invention being to produce a wheel attachment for drag scrapers which can be readily and quickly attached to drag scrapers to convert them into wheel scrapers without impairing the working of the scraper as a drag scraper when the wheel attachment is taken off.

A further object of the invention is to produce a simple and ready means for raising or lowering the wheel structure and also for adjusting the same at any desired height.

A further object of the invention is to produce a simple and inexpensive device and yet one which will be exceedingly effective for the purposes for which it is designed.

These objects I accomplish by means of such structure and relative arrangements of the parts as will fully appear by a perusal of the following specification and claims.

In the drawings similar characters of reference indicate corresponding parts in the several views.

Figure 1 is a side elevation of the complete device. Fig. 2 is a front elevation of the same. Fig. 3 is a detached view of a wheel adjusting means. Fig. 4 is a sectional view taken on a line X—X of Fig. 3. Fig. 5 is a detached view of a spring catch adjustment. Fig. 6 is a side elevation of a spring catch.

Referring now more particularly to the characters of reference on the drawings, 1 designates the bowl of the scraper proper which may be any ordinary type of drag scraper and is provided with the usual handle 2.

When it is desired to apply my improved structure I provide an auxiliary handle 3 having projecting arms 4, one adapted to project on each side of the bowl 1 and each having an inward bend at its outer end and being thereafter pivoted to the bowl 1 as at 6, by means of bolts or other suitable securing means, by which the wheel structure may be easily and quickly attached or taken off of the bowl of the scraper.

The numeral 7 designates wheels having hubs 8 mounted on bushings 9, there being dust caps 10 screw mounted on each end of the bushings 9 and disposed around the axles $9^a$ to keep out the dust and dirt. The said axles $9^a$ have upwardly projecting pins 11 provided with vertical key-ways 12 adapted to receive blocks 13 having projecting flanges 14 fitting on each side of the members 4 and being secured there by means of U-bolts 16 projecting around the pins 11 and through a plate 15 where they are secured by nuts $16^a$. By means of this structure the position of the wheels 7 with relation to the members 4 may be adjusted.

The member 3 is provided with a projecting bolt 17 in its side mounted on which is a plate 18 having a catch 19 adapted to engage the underside of the member 2, there being a spring 20 interposed between the head of the bolt 17 and said plate 18 which holds said catch 19 in engagement with the member 2. A bell crank 21 is fulcrumed to the underside of the member 3 and normally engages the member 18 and is provided with a rod 22 leading to an operating handle 23. The operation of the handle 23 pulls on the bell crank 21 to cause it to move against the plate 18 which disengages the hook 19 from the member 2. This action then permits the member 3 and incidentally the members 4 to be moved on the pivotal points 6 which permits the wheels 7 to be raised away from supporting the bowl 1 whereupon the said bowl can be used to scrape itself full of dirt and then when the bowl is full of dirt the handle 3 may be brought back into position so as to cause the catch 19 to engage the member 2 which again brings the wheels 7 into supporting position and holds them there whereupon the scraper may be readily conveyed to any point desired.

As an auxiliary support I provide a wheel 24 having two supporting plates 25 disposed on each side of the members 2 and 3 and secured to the member 2 by means of a U-bolt 26 having nuts 26ª by means of which they can be adjusted at any point desired.

In practice the wheels 7 should be adjusted along the arms 4 so that most of the load will be on such wheels, the scraper tilting back on the hind wheels 24 only enough to keep it from tilting forward and dumping.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A device of the character described comprising the combination with a scraper bowl, of a handle member having arms adapted to be connected with said scraper bowl, wheels having upwardly projecting pins, U-bolts adapted to secure said pins to said arms, and means for adjusting said pins vertically in said U-bolts, as described.

2. A device of the character described comprising the combination with a scraper bowl, of a handle member having arms adapted to be attached to said scraper bowl, wheels having pins provided with keyways, blocks movable vertically in said keyways, projecting flanges on said blocks engaging said arms and U-bolts joining said arms, blocks and pins, as described.

3. A device of the character described comprising the combination with a scraper bowl having a handle, of an independent handle member provided with arms adapted to be attached to said scraper bowl, wheels mounted on said arms, means for fastening said independent handle member stationary with respect to the handle member on said scraper bowl, such fastening means comprising a spring pressed plate movable transversely with respect to said independent handle member and having a catch adapted to engage the handle on said scraper bowl, a bell-crank mounted on said independent handle member and adapted to engage said plate, an operating rod connected with said bell-crank, a handle member pivoted on said independent handle member, said rod engaging said last named handle member, as described.

4. A device of the character described comprising a handle member having arms adapted to be pivoted to a scraper bowl, wheels having supporting means adjustable vertically in said arms and means for fixing said handle member stationary with respect to said bowl, as described.

In testimony whereof I affix my signature in presence of two witnesses.

SAMUEL BLODGETT.

Witnesses:
STEPHEN N. BLEWETT,
CLARENCE SMITH.

---

Copies of this patent may be obtained for five cents each, by addressing the "Commissioner of Patents, Washington, D. C."